Oct. 2, 1951 C. J. VAN LOON 2,570,016
SUPERHETERODYNE RECEIVING CIRCUIT ARRANGEMENT
Filed Feb. 16, 1948
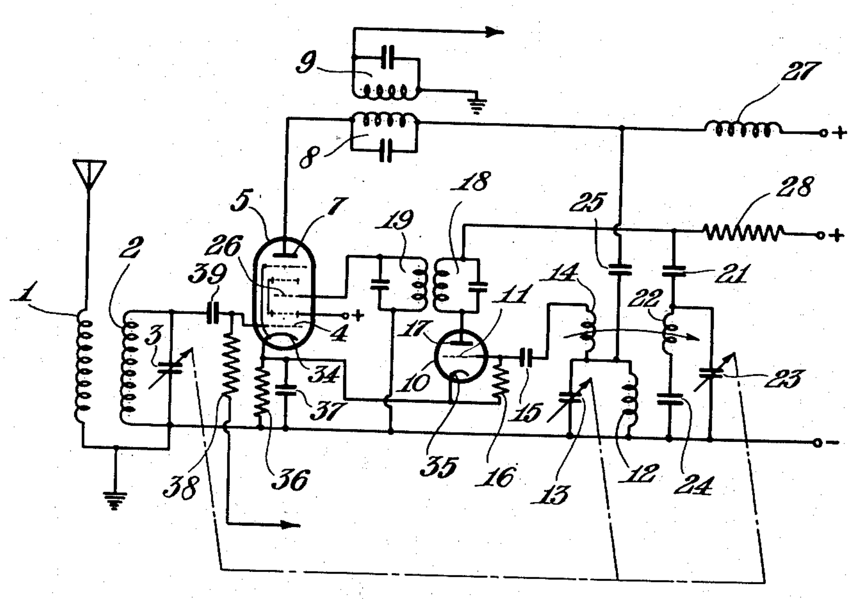
INVENTOR.
CAREL JAN VAN LOON.
BY [signature]
AGENT.

Patented Oct. 2, 1951

2,570,016

UNITED STATES PATENT OFFICE 2,570,016

SUPERHETERODYNE RECEIVING CIRCUIT ARRANGEMENT

Carel Jan van Loon, Eindhoven, Netherlands, assignor to Hartford National Bank and Trust Company, Hartford, Conn., as trustee Application March 16, 1948, Serial No. 15,194
In the Netherlands March 29, 1947

3 Claims. (Cl. 250—20)

This invention relates to a superheterodyne receiving circuit-arrangement, in which a mixer stage is preceded by a high frequency amplification stage, and has for its object to construct such an arrangement in a very simple manner. In arrangements of the said kind it is customary to amplify the intermediate-frequency output energy of the mixer stage in one or more intermediate-frequency amplification stages which comprise amplifying tubes and intermediate-frequency band-pass filters.

The invention is based on the realisation that it is possible in such arrangements to combine different functions in a single amplifying tube without involving troublesome disturbances and without it being necessary for the tube to be constructed in a special manner.

The invention consists in that in the high-frequency amplifying tube the intermediate-frequency oscillations are also amplified by employing a tube comprising a number of control grids and by providing that the high-frequency and the intermediate-frequency oscillations are operative at different control grids. The high-frequency oscillations are preferably made operative at the internal control-grid, and the intermediate-frequency oscillations at the external control-grid, since in this manner the signal-to-noise ratio is optimum.

A very simple arrangement is obtained if a triode is employed to constitute the mixer tube and is united with the amplifying tube to form an assembly.

To prevent the occurrence of disturbing howling due to interfering oscillations of which the frequency is slightly different from the oscillator frequency, very thorough pre-selection is necessary. To this end the mixing is effected with a harmonic of the frequency to which the oscillator circuit is tuned. In this case the frequency spacing between the oscillator frequency and the frequency of the incoming signal is larger, at least if the intermediate-frequency is small relatively to the signal frequency as is particularly the case in receiving ultra-high-frequency oscillations.

The tube for amplifying the high-frequency oscillations and the intermediate-frequency oscillations is adapted to be combined with the mixer tube to form a single tube of which the two systems are contained in a single envelope. Similar tubes, for instance triode-heptodes, have already been used for other purposes. In this manner a combination is obtained of a high-frequency amplification stage, a mixer stage and an intermediate-frequency amplification stage, which can be effected by extremely simple means.

In order that the invention may be more clearly understood and readily carried into effect, it may now be described more fully with reference to the accompanying drawing representing, by way of example, one embodiment thereof.

In the drawing the reference numeral 1 denotes the antenna-circuit which is inductively coupled with the input circuit tuned to the signal frequency of the first high-frequency amplifying tube 5 and comprises an inductance 2 and a variable capacity 3. This circuit is connected, through a condenser 39, between the first control-grid 4 of the tube 5 and earth. The cathode 34 is earthed through the parallel-connection of the resistance 36 and the condenser 37. Furthermore the control-grid 4 may be connected across a resistance 38 to a part of the arrangement wherein a carrier-wave dependent voltage is produced for automatic gain control. In addition to the said electrodes the tube comprises a second control-grid 26, an anode 7, two screen grids which are connected between the control grids and between the second control grid and earth respectively and have a positive voltage with respect to the cathode, and a suppressor grid which is located at the anode and connected to the cathode. The anode 7 is connected, through a circuit 8 tuned to the intermediate frequency and an inductance 27, to the positive terminal of a supply. By means of the resistance 36 and the condenser 37 a negative bias is obtained for the grid 4. The circuit 8 is inductively coupled with a circuit 9 which is likewise tuned to the intermediate frequency, these two circuits together constituting an intermediate-frequency band-pass filter. The circuit 9 may be connected to a detector (not represented) by means of which the low-frequency oscillations are obtained. It is also possible to connect one or more intermediate-frequency amplification stages between the circuit 9 and the detector.

The high-frequency oscillations appearing in the anode circuit of tube 5 are transmitted, through a condenser 25, to an oscillatory circuit which comprises a coil 12 and a variable condenser 13 and, similarly to the circuit 2 and 3, is tuned to the incoming frequency. To this end the condensers 3 and 13 may be coupled in a well-known manner. The said circuit 12, 13 is connected, in series with a coupling coil 14 and a condenser 15, between the grid 11 of a triode 10 and earth. The cathode 35 of the triode 10 is connected to the cathode of tube 5. Furthermore a grid-leakage resistance 16 is provided between the grid and the cathode of the triode 10.

The said triode 10 functions as an oscillator. To this end the anode circuit is connected, through a condenser 21, to a circuit which is tuned to the oscillator frequency and comprises a coil 22, a tunable condenser 23 and a condenser 24 which is connected in series with the coil 22. The last-mentioned condenser serves in a well-known manner for establishing a definite relation between the natural frequency of this circuit and the frequency to which the circuits 2, 3 and 12, 13 are tuned. The coil 22 is inductively coupled with the coil 14 in such manner that the tube 10 produces oscillations of which the frequency is determined by the tuning of the circuit 22, 23, 24. The condenser 23 is mechanically coupled to the condensers 3 and 13 so that the definite desired frequency relation is maintained throughout the tuning range. The anode 17 of the tube 10 is connected, through a circuit 18 tuned to the intermediate-frequency and a resistance 28, to the positive terminal of a source of anode potential. The circuit 18 is coupled with the circuit 19 which is likewise tuned to the intermediate-frequency and connected between the second control-grid 26 and earth, these two circuits constituting a band-pass filter.

The operation of the circuit-arrangement is as follows:

The incoming high-frequency oscillations are amplified in the tube 5 and appear, through the condenser 25 and the circuit 12, 13, in the grid-circuit of the triode 10 operating as a mixer tube. Furthermore, the oscillation produced in the tube 10 itself is operative in the said grid circuit so that upon mixing an oscillation of different frequency occurs in the circuit 18 which oscillation influences, through the circuit 19, the second control-grid 26 of tube 5. Consequently the tube 5 functions at the same time as an intermediate-frequency amplifier and the amplified intermediate-frequency oscillations are taken in the manner as described from the circuit 9.

If in the circuit-arrangement as described the circuit 22, 23 and 24 is tuned to the heterodyne frequency and the latter is little different from the incoming frequency, as is usually the case in receiving ultra-short waves, disadvantages may occur which consist in the production of troublesome howling. It has been found that these disadvantages can be completely avoided if, according to the invention, the circuit 22, 23, 24 is tuned to a frequency of which the heterodyne frequency is a whole multiple, so that the mixing is effected with a harmonic of the oscillator frequency proper. If, for instance, a frequency of 10 megacycles/sec. is received and the intermediate frequency is 0.5 megacycle/sec. the circuit 22, 23, 24 may be tuned to a frequency 5, 25 megacycles/sec. so that the desired intermediate frequency is obtained by mixing the signal frequency with the second harmonic of the oscillator frequency.

Although the tubes 5 and 10 are separated in the drawing, the simplest arrangement is obtained by combining them to form a single tube comprising two systems. This offers the advantage that a single tube, which is already known for other purposes, permits an amplifier to be obtained which is adapted to operate simultaneously as a high-frequency amplifier, as a mixer tube and as an intermediate-frequency amplifier.

This tube permits of attaining a very high amplification factor of say, 15,000 times.

The circuit-arrangement according to the invention has the additional advantage that the external radiation is very small. Furthermore the signal-to-noise ratio is very favourable and in controlling frequency displacement does not occur; moreover, the frequency change on heating up is much smaller than in the conventional arrangements. The amplification control of a tube by means of a control voltage applied to the control grid 4 is very effective, since it influences both the high-frequency amplification and the intermediate-frequency amplification.

What I claim is:

1. A superheterodyne receiving circuit arrangement comprising an electron discharge tube having in the order named a cathode, first and second control grids and an anode, means to apply a signal voltage of given frequency to said first control grid, means to derive from said anode an amplified voltage of said given frequency, means coupled to said anode to produce a beating frequency wave and to combine said beating frequency wave with the said amplified signal voltage to produce an intermediate frequency wave, means to apply said intermediate frequency wave to the second control grid, and means coupled to said anode to derive therefrom an amplified intermediate frequency wave.

2. A superheterodyne receiving circuit arrangement comprising an electron discharge tube having in the order named, a cathode, first and second control grids and an anode, means to apply a signal voltage of given frequency to said first control grid, a first load impedance element coupled to said anode to derive from said anode an amplified voltage of said given frequency, means coupled to said load impedance element to produce a beating frequency wave and to combine said beating frequency wave with the said amplified signal voltage to produce an intermediate frequency wave, means to apply said intermediate frequency wave to the other of said control grids, and a second load impedance element coupled to said anode to derive therefrom an amplified intermediate frequency wave.

3. A superheterodyne receiving circuit arrangement comprising a first electron discharge tube having in the order named a cathode, first and second control grids and an anode, means to apply a signal voltage of given frequency to said first control grid, a first load impedance element coupled to said anode to derive from said anode an amplified voltage of said given frequency, a second electron discharge tube having a cathode, a control grid and anode, resonance means coupling said latter control grid and latter anode in feedback relationship to produce a beating frequency wave, means to couple said latter control grid to said first load impedance element to thereby apply said amplified signal voltage to said latter control grid, a second load impedance element coupled to said latter anode to derive therefrom an intermediate frequency wave, means to couple said second load impedance to said second control grid to apply said intermediate frequency wave to the said second control grid, and a third load impedance element coupled to the anode of said first tube to derive therefrom an amplified intermediate frequency wave.

CAREL JAN VAN LOON.

REFERENCES CITED

The following references are of record in the file of this patent:

UNITED STATES PATENTS

| Number | Name | Date |
|---|---|---|
| 1,675,323 | Armstrong | July 3, 1928 |
| 2,058,512 | Rust et al. | Oct. 27, 1936 |
| 2,067,536 | Klotz | Jan. 12, 1937 |
| 2,088,043 | Strutt | July 27, 1937 |
| 2,122,283 | Harris | June 28, 1938 |
| 2,201,365 | Case | May 21, 1940 |
| 2,302,867 | Hunt | Nov. 24, 1942 |
| 2,323,250 | Smith | June 29, 1943 |